(12) United States Patent
Ouyang et al.

(10) Patent No.: US 11,376,541 B2
(45) Date of Patent: Jul. 5, 2022

(54) TETRAHEDRAL FILTER MEDIA

(71) Applicant: Cummins Filtration IP, Inc., Columbus, IN (US)

(72) Inventors: Ming Ouyang, St. Paul, MN (US); Miao Li, McFarland, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 344 days.

(21) Appl. No.: 16/468,460

(22) PCT Filed: Dec. 12, 2017

(86) PCT No.: PCT/US2017/065726
§ 371 (c)(1),
(2) Date: Jun. 11, 2019

(87) PCT Pub. No.: WO2018/111822
PCT Pub. Date: Jun. 21, 2018

(65) Prior Publication Data
US 2020/0078721 A1    Mar. 12, 2020

Related U.S. Application Data

(60) Provisional application No. 62/434,726, filed on Dec. 15, 2016.

(51) Int. Cl.
*B01D 46/52* (2006.01)
*B01D 46/00* (2022.01)
*B01D 46/10* (2006.01)

(52) U.S. Cl.
CPC ....... *B01D 46/525* (2013.01); *B01D 46/0002* (2013.01); *B01D 46/10* (2013.01);
(Continued)

(58) Field of Classification Search
CPC ...... B01D 46/525–527; B01D 46/0001; B01D 46/0002; B01D 46/10; B01D 46/522; B01D 2267/40; B01D 2279/60
See application file for complete search history.

(56) References Cited

U.S. PATENT DOCUMENTS 3,293,833 A    12/1966  Barany
3,410,062 A    11/1968  Hart
(Continued)

FOREIGN PATENT DOCUMENTS

CN    2126622    1/1993
CN    101060914    10/2007
(Continued)

OTHER PUBLICATIONS

International Search Report and Written Opinion for PCT/US2019/031132, dated Jul. 17, 2019, 12 pages.
(Continued)

*Primary Examiner* — Robert Clemente
(74) *Attorney, Agent, or Firm* — Foley & Lardner LLP (57) ABSTRACT

Filter media having generally tetrahedral shaped flow channels is described. The filter media is generally formed by a flat filter sheet and a formed sheet. The formed sheet may be formed by a curves and/or pleats in the sheet. The curves and/or pleats form the tetrahedron channels. Embossments, such as dimples, are provided on the crests formed by the curves and/or pleats. The embossments help to maintain spacing between adjacent layers of the filter media, thereby increasing dust holding capacity and decreasing pressure drop over similarly configured filter media not having the embossments.

20 Claims, 5 Drawing Sheets

(52) U.S. Cl.
CPC ........ *B01D 46/522* (2013.01); *B01D 2267/40* (2013.01); *B01D 2279/60* (2013.01)

(56) References Cited

U.S. PATENT DOCUMENTS

| | | | |
|---|---|---|---|
| 3,921,432 A | 11/1975 | Rivers | |
| 4,144,043 A | 3/1979 | Johnston | |
| 4,177,050 A | 12/1979 | Culbert et al. | |
| 4,235,611 A | 11/1980 | Brownell | |
| 4,268,290 A | 5/1981 | Barrington | |
| 4,498,915 A | 2/1985 | Witchell | |
| 4,528,008 A | 7/1985 | Takagi et al. | |
| 4,589,983 A | 5/1986 | Wydevan | |
| 4,925,561 A | 5/1990 | Ishii et al. | |
| 5,167,740 A | 12/1992 | Michaelis et al. | |
| 5,316,677 A | 5/1994 | Harms, II | |
| 5,320,657 A | 6/1994 | Adams | |
| 5,557,808 A | 9/1996 | Kawai | |
| 5,558,689 A | 9/1996 | Yanagihara et al. | |
| 5,814,117 A | 9/1998 | Mochida | |
| 5,980,759 A | 11/1999 | Proulx et al. | |
| 6,000,685 A | 12/1999 | Groten et al. | |
| 6,165,242 A | 12/2000 | Choi | |
| 6,238,561 B1 | 5/2001 | Liu et al. | |
| 6,273,938 B1 | 8/2001 | Fanselow et al. | |
| 6,391,076 B1 | 5/2002 | Jaroszczyk et al. | |
| 6,544,310 B2 | 4/2003 | Badeau et al. | |
| 6,582,490 B2 | 6/2003 | Miller et al. | |
| 6,598,749 B2 | 7/2003 | Paul et al. | |
| 6,656,243 B2 | 12/2003 | Hodge | |
| 6,746,500 B1 | 6/2004 | Park et al. | |
| 6,932,850 B1 | 8/2005 | Welch et al. | |
| 7,311,747 B2 | 12/2007 | Adamek et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,425,227 B1 | 9/2008 | Hutchison et al. | |
| 7,488,365 B2 | 2/2009 | Golden et al. | |
| 7,497,886 B2 | 3/2009 | Walker | |
| 7,534,279 B2 | 5/2009 | Oh et al. | |
| 7,552,506 B2 | 6/2009 | Lee et al. | |
| 7,588,619 B2 | 9/2009 | Chilton et al. | |
| 7,625,418 B1 | 12/2009 | Choi | |
| 7,648,546 B2 | 1/2010 | Haberkamp et al. | |
| 7,736,408 B2 | 6/2010 | Bock et al. | |
| 7,779,507 B2 | 8/2010 | Jung et al. | |
| 7,797,790 B2 | 9/2010 | Park et al. | |
| 7,815,703 B2 | 10/2010 | Park | |
| 7,879,125 B2 | 2/2011 | Haberkamp et al. | |
| 7,883,572 B2 | 2/2011 | Neudeck | |
| 7,922,006 B2 | 4/2011 | Fall et al. | |
| 7,931,723 B2 | 4/2011 | Cuvelier | |
| 8,075,720 B2 | 12/2011 | Fall et al. | |
| 8,276,605 B2 | 10/2012 | Heathcote et al. | |
| 8,397,920 B2 | 3/2013 | Moy et al. | |
| 8,491,689 B2 | 7/2013 | Duffy et al. | |
| 8,545,658 B2 | 10/2013 | Spearin et al. | |
| 8,615,844 B2 | 12/2013 | Van Raalte et al. | |
| 8,728,188 B2 | 5/2014 | Kim et al. | |
| 8,852,310 B2 | 10/2014 | Holzmann et al. | |
| 8,888,885 B2 | 11/2014 | Barreteau et al. | |
| 9,038,235 B2 | 5/2015 | Van Der Kooi et al. | |
| 9,061,234 B2 | 6/2015 | Lundquist | |
| 9,180,396 B2 | 11/2015 | Maruyama | |
| 9,370,742 B2 | 6/2016 | Edwards et al. | |
| 9,457,307 B2 | 10/2016 | Kaufmann et al. | |
| 9,504,950 B2 | 11/2016 | Holzmann et al. | |
| 9,808,753 B2 | 11/2017 | Lise et al. | |
| 10,786,774 B2 | 9/2020 | Rocklitz et al. | |
| 2005/0072131 A1 | 4/2005 | Tate et al. | |
| 2006/0091084 A1 | 5/2006 | Merritt et al. | |
| 2006/0272305 A1 | 12/2006 | Morgan | |
| 2007/0011996 A1 | 1/2007 | Tsuchiya et al. | |
| 2007/0056691 A1 | 3/2007 | Lin | |
| 2007/0102101 A1 | 5/2007 | Spearin et al. | |
| 2007/0130895 A1 | 6/2007 | Boeck et al. | |
| 2007/0186528 A1* | 8/2007 | Wydeven | B01D 46/527 55/498 |
| 2007/0209343 A1 | 9/2007 | Cuvelier | |
| 2007/0262016 A1 | 11/2007 | Fall et al. | |
| 2007/0294856 A1 | 12/2007 | Park | |
| 2008/0000827 A1 | 1/2008 | Bruss | |
| 2008/0010957 A1 | 1/2008 | Yun et al. | |
| 2008/0011673 A1 | 1/2008 | Janikowski et al. | |
| 2008/0104795 A1 | 5/2008 | Lang | |
| 2008/0120952 A1 | 5/2008 | Chilton et al. | |
| 2008/0282890 A1* | 11/2008 | Rocklitz | B01D 46/526 95/273 |
| 2009/0032469 A1 | 2/2009 | Panzani et al. | |
| 2009/0056753 A1 | 3/2009 | Heathcote et al. | |
| 2009/0133212 A1 | 5/2009 | Morishita et al. | |
| 2009/0178232 A1 | 7/2009 | Hyun et al. | |
| 2009/0183338 A1 | 7/2009 | Van Raalte et al. | |
| 2009/0217820 A1 | 9/2009 | Neudeck | |
| 2009/0293224 A1 | 12/2009 | Hyun et al. | |
| 2010/0018173 A1 | 1/2010 | Park et al. | |
| 2010/0206173 A1 | 8/2010 | Oh | |
| 2010/0269463 A1 | 10/2010 | Duffy et al. | |
| 2011/0152054 A1 | 6/2011 | Fall et al. | |
| 2011/0186504 A1 | 8/2011 | Rocklitz | |
| 2011/0197556 A1* | 8/2011 | Brown | B01D 46/0002 55/498 |
| 2011/0252759 A1 | 10/2011 | Nicholas | |
| 2012/0047858 A1 | 3/2012 | Kim et al. | |
| 2012/0055127 A1 | 3/2012 | Holzmann et al. | |
| 2012/0118814 A1 | 5/2012 | Moy et al. | |
| 2012/0180664 A1 | 7/2012 | Lundquist | |
| 2012/0233807 A1 | 9/2012 | Van Der Kooi et al. | |
| 2013/0062276 A1 | 3/2013 | Barreteau et al. | |
| 2013/0189081 A1 | 7/2013 | Bryant et al. | |
| 2013/0306547 A1 | 11/2013 | Norris | |
| 2014/0014597 A1 | 1/2014 | Knight et al. | |
| 2014/0130467 A1 | 5/2014 | Herman et al. | |
| 2014/0137524 A1 | 5/2014 | Jarrier | |
| 2014/0165839 A1 | 6/2014 | Crabtree | |
| 2014/0209528 A1 | 7/2014 | Eleftherakis et al. | |
| 2014/0209529 A1 | 7/2014 | Eleftherakis et al. | |
| 2014/0235419 A1 | 8/2014 | Lise et al. | |
| 2014/0260132 A1 | 9/2014 | Maruyama | |
| 2014/0260138 A1 | 9/2014 | Edwards et al. | |
| 2015/0013290 A1 | 1/2015 | Holzmann et al. | |
| 2015/0047304 A1 | 2/2015 | Son | |
| 2015/0059301 A1 | 3/2015 | Kaufmann et al. | |
| 2015/0165348 A1 | 6/2015 | Lo | |
| 2015/0165352 A1 | 6/2015 | Lang | |
| 2015/0165362 A1 | 6/2015 | Canfield et al. | |
| 2015/0211452 A1* | 7/2015 | Brown | F02M 35/0245 55/482 |
| 2015/0251111 A1 | 9/2015 | Savstrom et al. | |
| 2015/0305583 A1 | 10/2015 | Jonsson | |
| 2015/0315544 A1 | 11/2015 | Hamman | |
| 2016/0016100 A1 | 1/2016 | Mouanda et al. | |
| 2016/0067647 A1 | 3/2016 | Tate et al. | |
| 2016/0193714 A1 | 7/2016 | Machama et al. | |
| 2016/0214053 A1 | 7/2016 | Schwartz | |
| 2016/0219954 A1 | 8/2016 | Nakamura | |
| 2016/0265436 A1 | 9/2016 | Bryant et al. | |
| 2016/0296773 A1 | 10/2016 | Lin | |
| 2017/0028339 A1 | 2/2017 | Savstrom | |
| 2017/0056793 A1 | 3/2017 | Klein et al. | |
| 2017/0056807 A1 | 3/2017 | Klein et al. | |
| 2017/0065924 A1 | 3/2017 | Holzmann et al. | |
| 2017/0197165 A1 | 7/2017 | Schwartz et al. | |
| 2017/0216757 A1* | 8/2017 | Ouyang | B01D 46/525 |
| 2017/0234221 A9 | 8/2017 | Bryant et al. | |
| 2017/0259216 A1 | 9/2017 | Madhavaram et al. | |
| 2017/0266617 A1 | 9/2017 | Difrancesco et al. | |
| 2019/0046915 A1 | 2/2019 | Gieseke et al. | |
| 2019/0329170 A1 | 10/2019 | Page et al. | |
| 2020/0078721 A1 | 3/2020 | Ouyang et al. | |

(56) References Cited

U.S. PATENT DOCUMENTS

FOREIGN PATENT DOCUMENTS

| CN | 101534923 A | 9/2009 |
| CN | 101626820 | 1/2010 |
| CN | 103796726 A | 5/2014 |
| DE | 10 309 661 A1 | 9/2004 |
| EP | 1 254 689 | 11/2002 |
| GB | 2 131 717 | 6/1984 |
| JP | 5333550 | 11/2013 |
| WO | WO-2012/067729 | 5/2012 |
| WO | WO-2013/133865 | 9/2013 |
| WO | WO 2016/019307 | 2/2016 |
| WO | WO-2016/014549 | 3/2016 |
| WO | WO 2016/040332 | 3/2016 |
| WO | WO-2016/077377 A1 | 5/2016 |
| WO | WO-2017/031168 A1 | 2/2017 |
| WO | WO-2017/066169 A1 | 4/2017 |
| WO | WO-2018/191147 A1 | 10/2018 |
| WO | WO-2018/191865 A1 | 10/2018 |
| WO | WO-2019/040324 A1 | 2/2019 |
| WO | WO-2019/060904 A2 | 3/2019 |

OTHER PUBLICATIONS

Office Action issued for German Patent Application No. DE 112011103785.6 dated Mar. 5, 2021, 19 pages.
International Search Report and Written Opinion issued for PCT/US2017/056744, dated Feb. 13, 2018, 15 pages.
International Search Report and Written Opinion issued for PCT/US2017/065726, dated Feb. 16, 2018, 11 pages.
First Examination Report for Indian Patent App. No. 809/KOLNP/2012 dated Oct. 8, 2018, 6 pages.
First Office Action for Chinese Patent App. No. 201410767340.7, dated Nov. 26, 2015, 14 pages (with translation).
International Search Report & Written Opinion for PCT/US2011/054924 dated Jan. 23, 2012, 9 pages.
International Search Report and Written Opinion for PCT/US2019/065259 dated Feb. 11, 2020, 15 pages.
First Office Action issued for Chinese Patent Application No. 2017800765908, dated Jan. 20, 2021, 13 pages.
Partial Search Report issued for European Patent Application No. EP 17862733.7, dated Apr. 17, 2020, 11 pages.
Second Office Action issued for Chinese Patent Application No. CN 201780064747.5, dated Jul. 23, 2021, 10 pages.

* cited by examiner

TETRAHEDRAL FILTER MEDIA

CROSS REFERENCE TO RELATED APPLICATIONS

The present application is a national stage of PCT Application No. PCT/US2017/065726, filed Dec. 2, 2017 which claims the benefit of priority to U.S. Provisional Patent Application No. 62/434,726, filed Dec. 15, 2016. The contents of both applications are incorporated herein by reference in their entirety.

TECHNICAL FIELD

The present application relates to filter media.

BACKGROUND

Internal combustion engines generally combust a mixture of fuel (e.g., gasoline, diesel, natural gas, etc.) and air. Many or all of the fluids passing through the internal combustion engine are filtered to remove particulate and contaminants from the fluids prior to entering the internal combustion engine. For example, prior to entering the engine, intake air is typically passed through a filter element to remove contaminants (e.g., particulates, dust, water, etc.) from the intake air prior to delivery to the engine. The filter media of the filter element captures and removes particulate from the intake air passing through the filter media. As the filter media captures and removes particulate, the restriction of the filter media increases. The filter media has a dust holding capacity that is defined as the amount of particulate that the filter media can capture without the need for replacement. After the dust holding capacity of the filter media is reached, the filter element may require replacement.

SUMMARY

Various example embodiments relate to filter media, filter elements containing the filter media, and filtration systems having the filter elements, one such filter media includes a first sheet of filter media having a first side and a second side. The first sheet is formed at an upstream end and a downstream end to have a plurality of curves that follow a sinusoidal pattern. The sinusoidal pattern forms a plurality of rounded tetrahedron flow channels that are alternately sealed to each other at the first side to define: a first set of rounded tetrahedron channels having open first ends, and a second set of rounded tetrahedron channels interdigitated with the first set of tetrahedron channels and having closed first ends. The filter media further comprises a second sheet of filter media extending across the first sheet of filter media, the second sheet of filter media is a flat sheet of filter media.

Another set of example embodiments relate to filter media. The filter media includes a curved sheet of filter media that is folded along a plurality of curves that follow a sinusoidal pattern, the sinusoidal pattern forming a plurality of rounded tetrahedron flow channels. The curved sheet of filter media includes a plurality of embossments. The plurality of embossments are arranged at crests of the rounded tetrahedron channel.

A further set of example embodiments relate to a filtration system. The filtration system includes a housing body. The housing body includes a housing outlet, a housing inlet, and a central compartment. A filter element is installed in the central compartment. The filter element includes filter media. The filter media includes a first sheet of filter media having a first side and a second side. The first sheet is formed at an upstream end and a downstream end to have a plurality of curves that follow a sinusoidal pattern. The sinusoidal pattern forms a plurality of rounded tetrahedron flow channels that are alternately sealed to each other at the first side to define: a first set of rounded tetrahedron channels having open first ends, and a second set of rounded tetrahedron channels interdigitated with the first set of tetrahedron channels and having closed first ends. The filter media further comprises a second sheet of filter media extending across the first sheet of filter media.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filter media having generally tetrahedral shaped flow channels is described. The filter media is generally formed by a flat sheet of filter media and a formed sheet of filter media. The formed sheet includes a plurality of crests formed by a curves and/or pleats in the sheet. The plurality of crests form tetrahedron channels between the formed sheet and the flat sheet. Embossments, such as dimples, are provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments.

Figure 1:
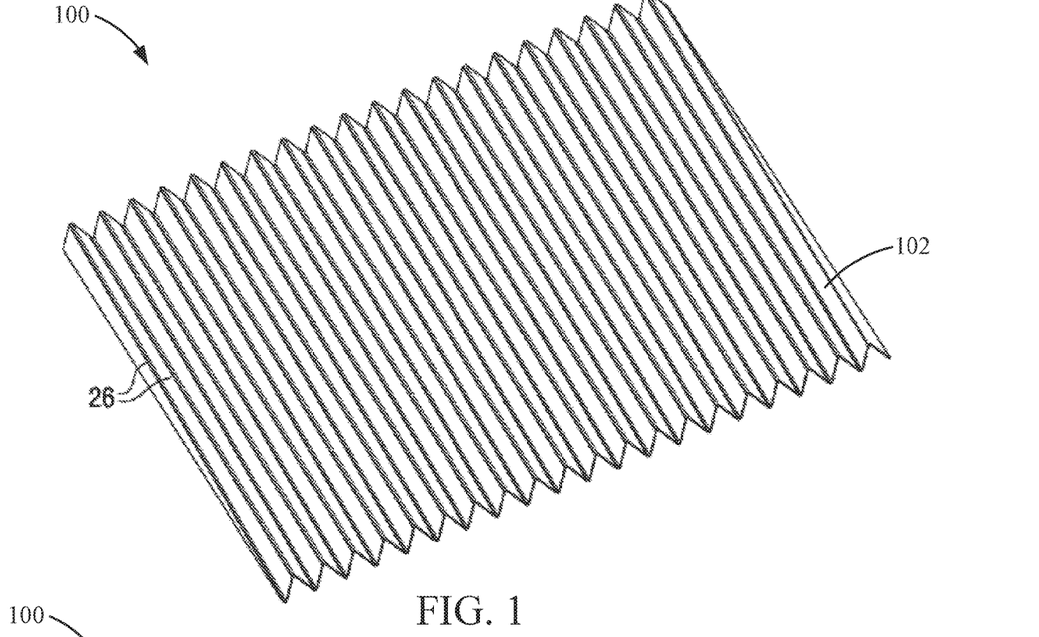
FIG. 1 shows a perspective view of a folded filter media sheet of filter media according to an example embodiment.
Figure 2:
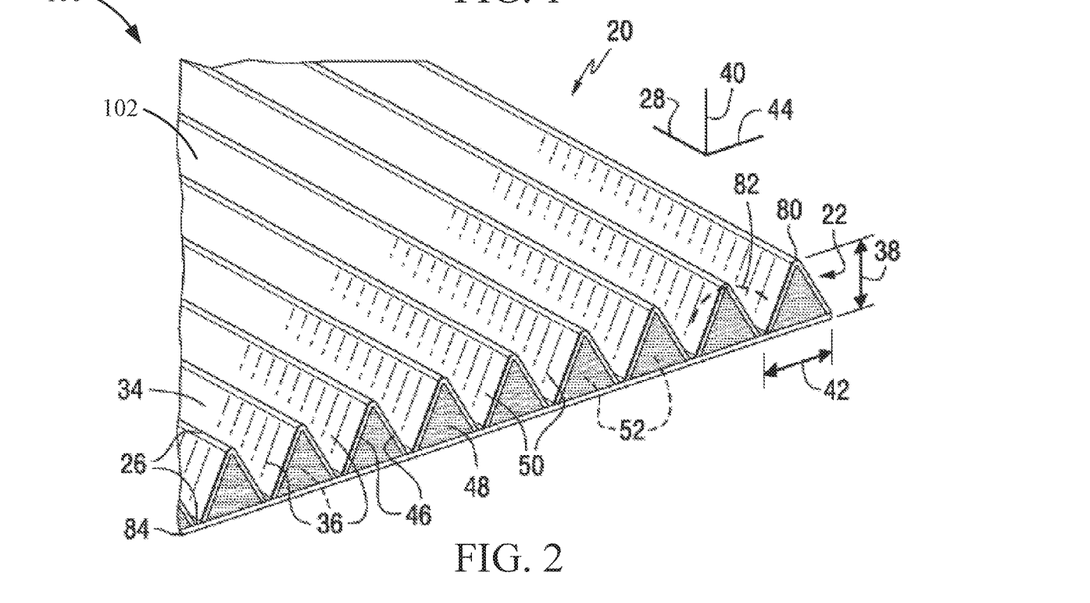
FIG. 2, FIG. 3, and FIG. 4 each show a different perspective view of the filter media of FIG. 1.
Figure 3:
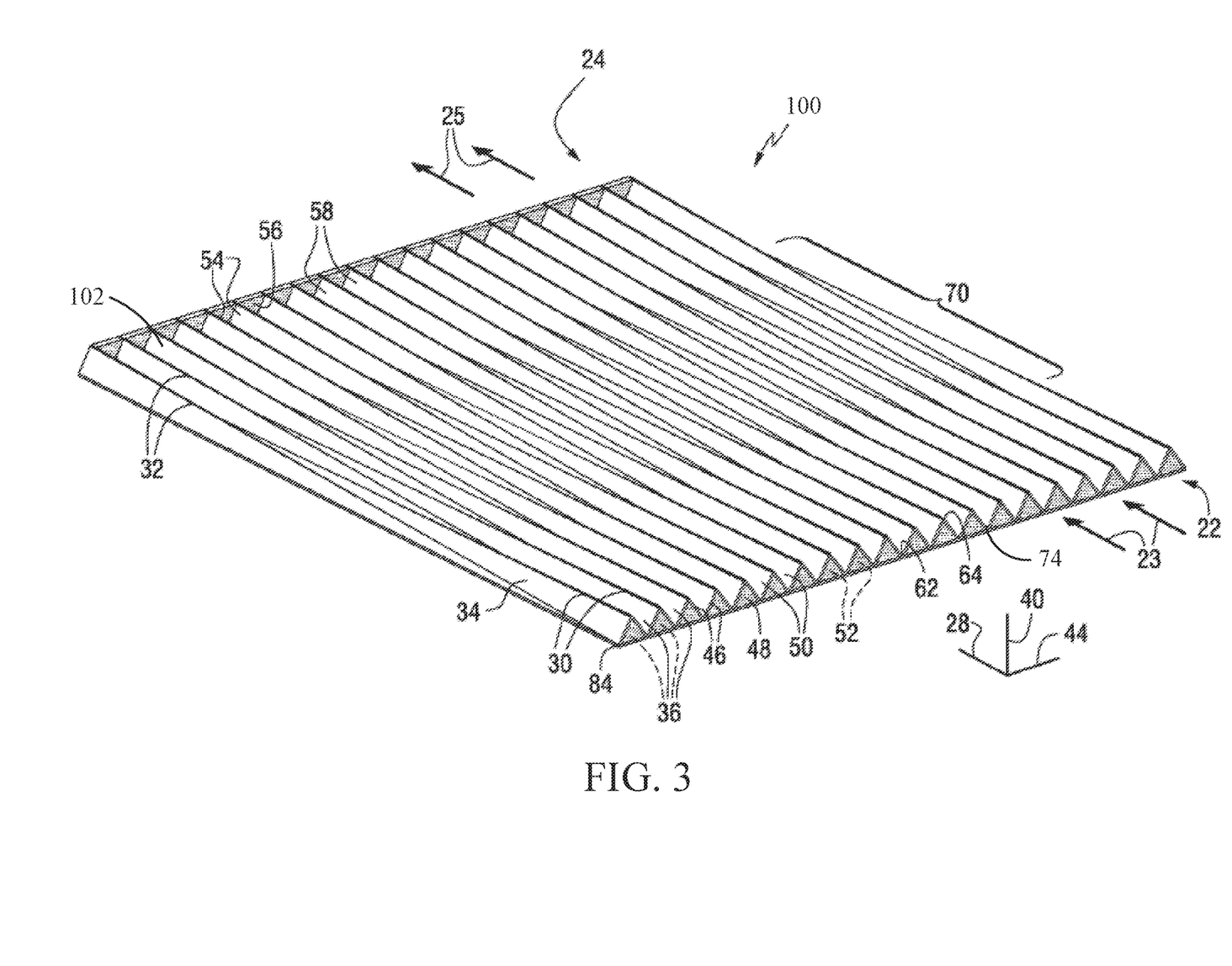
Figure 4:
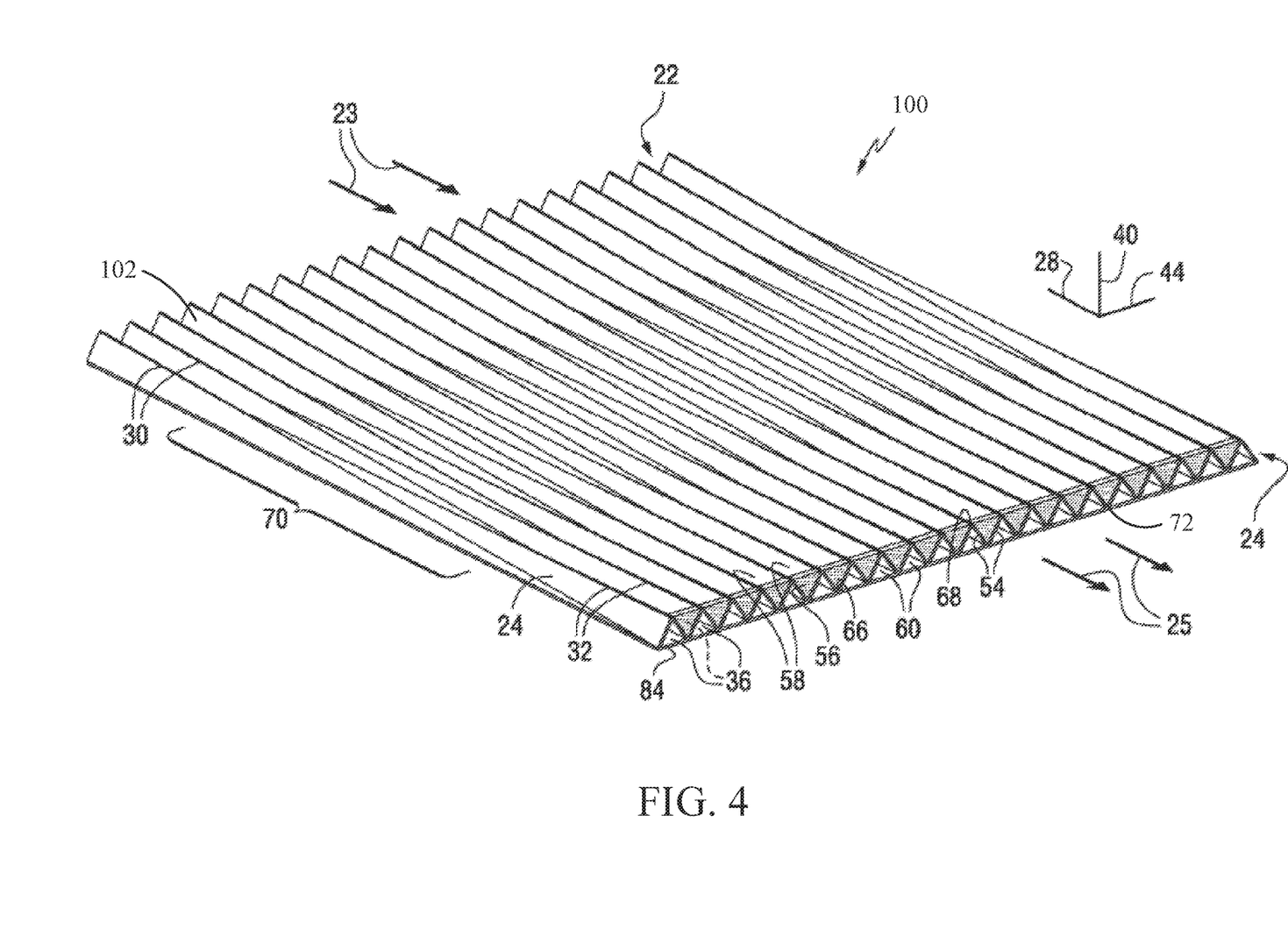

Referring to FIGS. 1-4, various views of filter media 100 are shown according to an example embodiment. FIG. 1 shows a perspective view of a folded (i.e., pleated) filter media sheet 102 of the filter media 100. FIGS. 2, 3, and 4 each show a different perspective view of the filter media 100. As described below, the filter media 100 includes a plurality of flow channels 36 that have a tetrahedral shape. Additional details of the filter media 100 are described in U.S. Pat. No. 8,397,920, which is herein incorporated by reference in its entirety and for all purposes. The filter media 100 is described as providing the basic structure of the contemplated filter media of the present application. As described in further detail below with respect to FIG. 5, the contemplated filter media 500 has a similar arrangement to the filter media 100, however, the filter media 500 has a formed sheet 502 that includes curves instead of bends and also includes embossments.

Returning to FIGS. 1-4, the filter media 100 has an upstream inlet 22 receiving incoming dirty fluid as shown at arrows 23, and a downstream outlet 24 discharging clean filtered fluid as shown at arrows 25. In some arrangements, the upstream inlet 22 is a first side of the filter media 100 and the downstream outlet 24 is a second side of the filter media 100. In other arrangements, the upstream inlet 22 is a second side of the filter media 100 and the downstream outlet 24 is a first side of the filter media 100. The filter media 100 is composed of a folded filter media sheet 102 that is pleated along a plurality of bend lines 26. The bend lines extend axially along an axial direction 28 (e.g., as shown best in FIGS. 2-4), and include a first set of bend lines 30 extending from upstream inlet 22 towards downstream outlet 24, and a second set of bend lines 32 extending from downstream outlet 24 axially towards upstream inlet 22. The filter media 100 comprises a plurality of filter media wall segments 34 extending in serpentine manner between the bend lines. The wall segments 34 extend axially and define axial flow channels 36 therebetween. The flow channels 36 have a height 38 along a transverse direction 40, which transverse direction 40 is perpendicular to axial direction 28 (e.g., as shown in FIG. 2). The flow channels 36 have a lateral width 42 along a lateral (e.g., longitudinal) direction 44. The lateral direction is perpendicular to axial direction 28 and is perpendicular to transverse direction 40. As described below, at least some of the noted bend lines taper in the noted transverse direction as they extend axially in the noted axial direction.

The wall segments 34 include a first set of wall segments 46 (e.g., as shown in FIGS. 2 and 3) that are alternately sealed to each other at upstream inlet 22 (e.g., by adhesive 48 or the like) to define a first set of channels 50 having open upstream ends, and a second set of tetrahedron channels 52 interdigitated with the first set of tetrahedron channels 50 and having closed upstream ends. The wall segments 34 include a second set of wall segments 54 (e.g., as shown in FIGS. 3 and 4) that are alternately sealed to each other at downstream outlet 24 (e.g., by adhesive 56 or the like) to define a third set of tetrahedron channels 58 having closed downstream ends, and a fourth set of tetrahedron channels 60 (e.g., as shown in FIG. 4) having open downstream ends. The first set of bend lines 30 comprises a first subset of bend lines 62 defining the first set of tetrahedron channels 50, and a second subset of bend lines 64 defining the second set of tetrahedron channels 52. The second subset of bend lines 64 taper in transverse direction 40 as they extend from upstream inlet 22 axially towards downstream outlet 24 (e.g., as shown in FIGS. 3 through 6). The second set of bend lines 32 comprises a third subset of bend lines 66 defining the third set of tetrahedron channels 58, and a fourth subset of bend lines 68 defining the fourth set of tetrahedron channels 60. The fourth subset of bend lines 68 taper in the transverse direction 40 as they extend from downstream outlet 24 axially towards upstream inlet 22 (e.g., as shown in FIGS. 3 through 6). The second set of tetrahedron channels 52 have a decreasing transverse channel height 38 along transverse direction 40 as the second set of tetrahedron channels 52 extend axially along axial direction 28 towards downstream outlet 24. The tapering of the second subset of bend lines 64 in the transverse direction 40 provides the decreasing transverse channel height 38 of the second set of tetrahedron channels 52. The fourth set of tetrahedron channels 60 have a decreasing transverse channel height along transverse direction 40 as the fourth set of tetrahedron channels 60 extend axially along axial direction 28 towards upstream inlet 22. The tapering of the fourth subset of bend lines 68 in the transverse direction 40 provides the decreasing transverse channel height 38 of the fourth set of tetrahedron channels 60.

Still referring to FIGS. 1-4, incoming dirty fluid (represented by arrows 23) to be filtered flows along axial direction 28 into open tetrahedron channels 50 at upstream inlet 22 and passes laterally and/or transversely through the filter media wall segments of the pleated filter element and then flows axially along axial direction 28 as clean filtered fluid through open tetrahedron channels 60 at downstream outlet 24. A second subset of bend lines 64 provides lateral cross-flow thereacross along lateral direction 44 between respective channels downstream of upstream inlet 22. A fourth subset of bend lines 68 provides lateral cross-flow thereacross along lateral direction 44 between respective channels upstream of downstream outlet 24. The second and fourth subsets of bend lines 64 and 68 have axially overlapping sections 70, and the noted lateral cross-flow is provided at least at axially overlapping sections 70.

The second subset of bend lines 64 taper to respective termination points 72 (e.g., as shown in FIGS. 3 and 4), providing at such termination points the minimum transverse channel height 38 of the second set of tetrahedron channels 52. The fourth subset of bend lines 68 taper to respective termination points 74, providing at such termination points the minimum transverse channel height 38 of the fourth set of tetrahedron channels 60. Termination points 72 of second subset of bend lines 64 are axially downstream of termination points 74 of fourth subset of bend lines 68. This provides the noted axially overlapping sections 70. Termination points 72 of second subset of bend lines 64 are at downstream outlet 24 in one embodiment, and in other embodiments are axially upstream of downstream outlet 24. Termination points 74 of fourth subset of bend lines 68 are at upstream inlet 22 in one embodiment, and in other embodiments are axially downstream of upstream inlet 22.

A first set of wall segments 46 alternately sealed to each other at adhesive 48 at upstream inlet 22 define a first set of tetrahedron channels 50 having open upstream ends, and a second set of tetrahedron channels 52 interdigitated with the first set of tetrahedron channels 50 and having closed upstream ends. A second set of wall segments 54 alternately sealed to each other at adhesive 56 at downstream outlet 24 define a third set of tetrahedron channels 58 having closed downstream ends, and a fourth set of tetrahedron channels 60 interdigitated with the third set of tetrahedron channels 58 and having open downstream ends. The first set of bend lines 30 includes the first subset of bend lines 62 defining the first set of tetrahedron channels 50, and the second subset of bend lines 64 defining the second set of tetrahedron channels 52. The second subset of bend lines 64 taper in the transverse direction 40 as they extend from upstream inlet 22 axially towards downstream outlet 24. The second set of bend lines 32 includes the third subset of bend lines 66 defining the third set of tetrahedron channels 58, and the fourth subset of bend lines 68 defining the fourth set of tetrahedron channels 60. The fourth subset of bend lines 68 taper in the transverse direction 40 as they extend from downstream outlet 24 axially towards upstream inlet 22.

First and second sets of tetrahedron channels 50 and 52 face oppositely to third and fourth sets of tetrahedron channels 58 and 60. Each of the first, second, third and fourth sets of tetrahedron channels 50, 52, 58, 60 is elongated in the axial direction 28. Each of the first, second, third and fourth sets of tetrahedron channels 50, 52, 58, 60 has a cross-sectional area along a cross-sectional plane defined by the transverse and lateral directions 40 and 44. The cross-sectional areas of the first and second sets of tetrahedron channels 50 and 52 decrease as the first and second sets of tetrahedron channels 50 and 52 extend along axial direction 28 from upstream inlet 22 toward downstream outlet 24. The cross-sectional areas of third and fourth sets of tetrahedron channels 58 and 60 decrease as the third and fourth sets of tetrahedron channels 58 and 60 extend along axial direction 28 from downstream outlet 24 toward upstream inlet 22. In some arrangements, the bend lines 26 are bent at a sharp pointed angle (e.g., as shown at 80 in FIG. 2). In other arrangements, the bend lines 26 are rounded along a given radius (e.g., as shown in dashed line at 82 in FIG. 2).

The elongated tetrahedron channels 58 and 60 allow for cross-flow between adjacent channels. In air filter implementations, this cross-flow allows for more even dust loading on the upstream side of the media. In one embodiment, the elongated tetrahedron channels are shaped to purposely allow for more upstream void volume than downstream void volume, to increase filter capacity. Various fluids may be filtered, including air or other gases, and including liquids.

The filter element is further provided with a substantially flat sheet 84 extending laterally across the bend lines. In one embodiment, the flat sheet 84 is formed of filter media material, which may be the same filter media material as the folded filter media sheet 102. In another arrangement, the flat sheet 84 is formed of a different filter media than the folded filter media sheet 102. The flat sheet 84 extends axially along the full axial length along axial direction 28 between upstream inlet 22 and downstream outlet 24, and extends laterally along the full lateral width along lateral direction 44 across and sealing the channels to prevent bypass of dirty upstream air to clean downstream air without passing through and being filtered by a wall segment 34. In some arrangements, the flat sheet 84 is generally rectiplanar along a plane defined by axial direction 28 and lateral direction 44.

In some arrangements, the flow through the filter media 100 is reversed from the above described flow direction. For example, air to be filtered can flow in the opposite direction defined by arrows 23 and 25 such that air to be filtered flows into what is represented as the downstream outlet 24, through the filter media 100, and out of what is represented as the upstream inlet 22. In such arrangements, the structure of the filter media 100 remains the same (i.e., the way the lines taper with respect to the upstream inlet 22 and the downstream outlet 24), but the flow through the media is reversed. As will be appreciated, due to the orientation and fluid flow path, the filter media may provide improvements in capacity over alternative arrangements.

Figure 5:
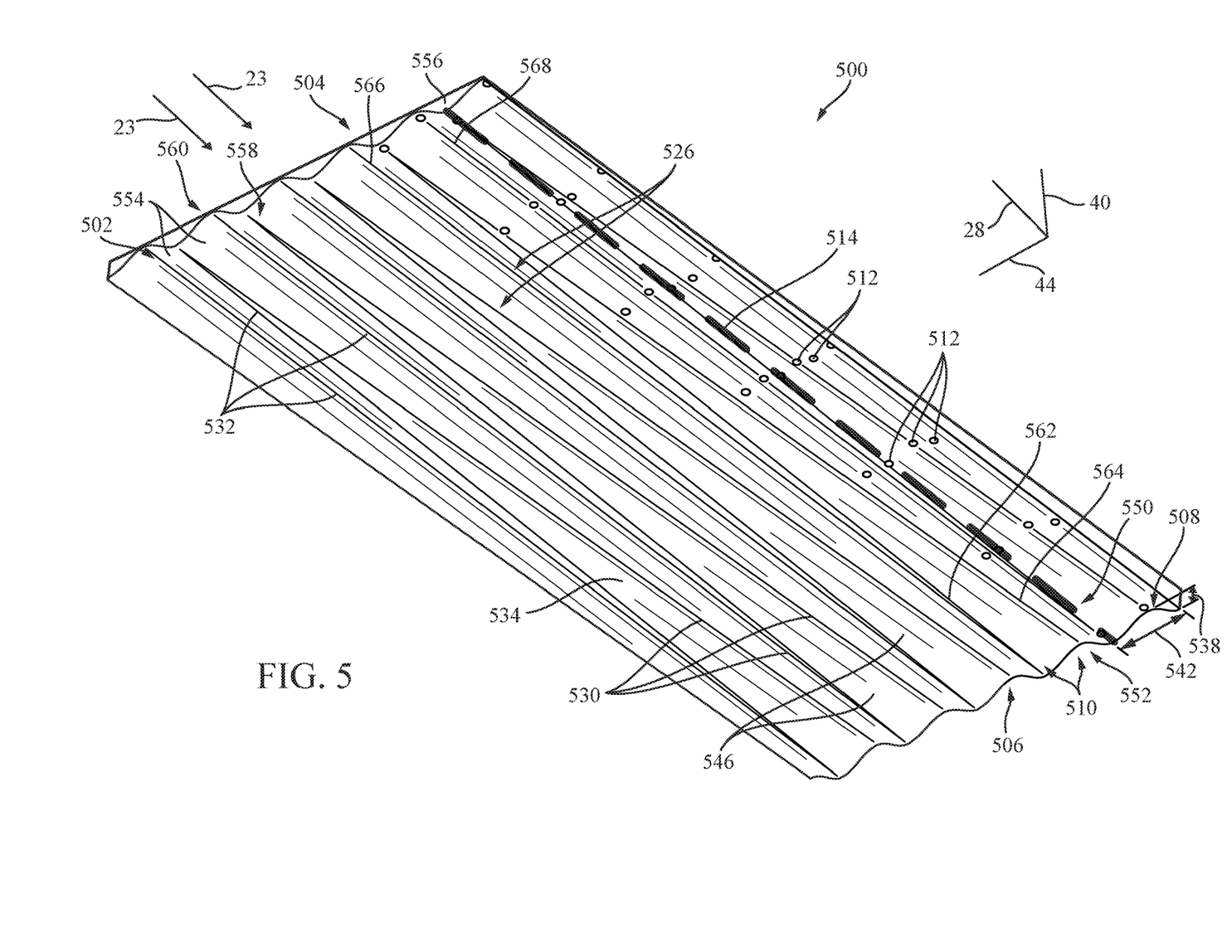
FIG. 5 shows a perspective view of a formed sheet of filter media according to an example embodiment.

Referring to FIG. 5, a perspective view of a formed sheet 502 of filter media 500 is shown according to an example embodiment. The formed sheet 502 is similar to the folded filter media sheet 102 of the filter media 100. In some arrangements, the formed sheet 502 is positioned between flat sheets of the filter media 500 in the same manner as described above with respect to the filter media 100. In some arrangements, the formed sheet 502 has a thickness of fifteen thousandths of an inch. In further arrangements, the formed sheet 502 has a thickness of eleven thousandths of an inch, which provides for a higher packing density than arrangements using fifteen thousandths of an inch thick media. The filter media 500 has an upstream side 504 and a downstream side 506 (with respect to fluid through the filter media 500). In some embodiments, the flow through the filter media 500 is reversed from the above described flow direction. For example, air to be filtered can flow in the opposite direction defined by arrows 23 such that air to be filtered flows into what is represented as the downstream side 506, through the filter media 500, and out of what is represented as the upstream side 504. In such arrangements, the structure of the filter media 500 remains the same (i.e., the way the lines taper with respect to the upstream side 504 and the downstream side 506), but the flow through the media is reversed. As will be appreciated, due to the orientation and fluid flow path, a filter media with a flow path reversed from the filter media 500 may provide improvements in capacity over alternative arrangements.

As opposed to the folded filter media sheet 102 of the filter media 100, the formed sheet 502 includes curves 508 (i.e., non-sharp rounded bends) instead of folds or pleats. In some arrangements, the curves 508 follow a sinusoidal pattern. The sinusoidal pattern provides structural strength to the formed sheet 502. The curves 508 may be formed in the formed sheet 502 through an embossing or pressing process. The curves 508 form interdigitated rounded tetrahedron flow channels 510 (as opposed to the tetrahedron channels 50 and 52 of the filter media 100). Each of the rounded tetrahedron flow channels 510 tapers in width and height from an open end to a point terminating at or before the opposite end. Adjacent interdigitated tetrahedron flow channels 510 are sealed on opposite ends in the same manner described above with respect to the filter media 100.

The filter media 500 is composed of a formed filter media sheet 502 that is curved along a plurality of curved bend lines 526. The curved bend lines 526 extend axially along an axial direction 28 and include a first set of bend lines 532 extending from upstream side 504 axially towards downstream side 506 and a second set of bend lines 530 extending from downstream side 506 towards upstream side 504. The filter media 500 comprises a plurality of filter media wall segments 534 extending in serpentine manner between the curved bend lines 526. The wall segments 534 extend axially and define axial rounded tetrahedron flow channels 510 therebetween. The rounded tetrahedron flow channels 510 have a rounded height 538 along a transverse direction 40, which transverse direction 40 is perpendicular to axial direction 28 (e.g., as shown in FIG. 5). The rounded tetrahedron flow channels 510 have a lateral width 542 along a lateral direction 44. The lateral direction 44 is perpendicular to axial direction 28 and is perpendicular to transverse direction 40. As described below, at least some of the noted curved bend lines taper in a curved manner in the noted transverse direction 40 as they extend axially in the noted axial direction 28.

In some embodiments, the wall segments 534 include a first set of wall segments 554 that are alternately sealed to each other at upstream side 504 (e.g., by adhesive 556 or the like) to define a first set of channels 560 having open upstream ends, and a second set of tetrahedron channels 558 interdigitated with the first set of tetrahedron channels 560 and having closed upstream ends. As will be appreciated, the first set of tetrahedron channels 560 and second set of tetrahedron channels 558 may be both open, both closed, or one open and the other closed, to accommodate the load and desired filter characteristics. The first set of bend lines 532 comprises a first subset of bend lines 568 defining the first set of tetrahedron channels 560 and a second subset of bend lines 566 defining the second set of tetrahedron channels 558, The first subset of bend lines 568 taper in a curved manner in the transverse direction 40 as they extend from upstream side 504 axially towards downstream side 506. The first set of tetrahedron channels 560 have a decreasing transverse channel height along transverse direction 40 as the first set of tetrahedron channels 560 extend axially along axial direction 28 towards downstream side 506. The tapering in a curved manner of the first subset of bend lines 568 in the transverse direction 40 provides the decreasing transverse channel height 538 of the first set of tetrahedron channels 560.

In some embodiments, a second set of wall segments 546 alternately sealed to each other at adhesive at downstream side 506 define a fourth set of tetrahedron channels 550 having open downstream ends, and a third set of tetrahedron channels 552 interdigitated with the fourth set of tetrahedron channels 550 and having closed downstream ends. As will be appreciated, the fourth set of tetrahedron channels 550 and third set of tetrahedron channels 552 may be both open, both closed, or one open and the other closed, to accommodate the load and desired filter characteristics. The second set of bend lines 530 includes the fourth subset of bend lines 562 defining the fourth set of tetrahedron channels 550, and the third subset of bend lines 564 defining the third set of tetrahedron channels 552. The third subset of bend lines 564 taper in a curved manner in in the transverse direction 40 as they extend from downstream side 506 axially towards upstream side 504. The second set of bend lines 530 comprises a fourth subset of bend lines 562 defining the fourth set of tetrahedron channels 550, and a third subset of bend lines 564 defining the third set of tetrahedron channels 552. The third subset of bend lines 564 taper in a curved manner in the transverse direction 40 as they extend from downstream side 506 axially towards upstream side 504. The third set of tetrahedron channels 552 have a decreasing transverse channel height 538 along transverse direction 40 as the third set of tetrahedron channels 552 extend axially along axial direction 28 towards upstream side 504. The tapering of the third subset of bend lines 564 in a curved manner in the transverse direction 40 provides the decreasing transverse channel height 538 of the third set of tetrahedron channels 552.

First and second sets of tetrahedron channels 560 and 558 face oppositely to third and fourth sets of tetrahedron channels 552, and 550, respectively. Each of the first, second, third and fourth sets of tetrahedron channels 560, 558, 552, 550 is elongated in the axial direction 28. Each of the first, second, third and fourth sets of tetrahedron channels 560, 558, 552, 550 has a curved cross-sectional area along a cross-sectional plane defined by the transverse and lateral directions 40 and 44. The cross-sectional areas of first and second sets of tetrahedron channels 560 and 558 decrease as the of first and second sets of tetrahedron channels 560 and 558 extend along axial direction 28 from upstream side 504 toward downstream side 506. The cross-sectional areas of the third and fourth sets of tetrahedron channels 552 and 550 decrease as the third and fourth sets of tetrahedron channels 552 and 550 extend along axial direction 28 from downstream side 506 toward upstream side 504. In some arrangements, the curved bend lines 526 are rounded along a given radius.

The filter element is further provided with a substantially flat sheet (not shown, but similar to the flat sheet 84 of FIGS. 2-4) extending laterally across the bend lines. In one embodiment, the flat sheet is formed of filter media material, which may be the same filter media material as the formed filter media sheet 502. In another arrangement, the flat sheet is formed of a different filter media than the formed filter media sheet 502. The flat sheet extends axially along the full axial length along axial direction 28 between upstream side 504 and downstream side 506, and extends laterally along the full lateral width along lateral direction 44 across and sealing the channels to prevent bypass of dirty upstream air to clean downstream air without passing through and being filtered by a wall segment 534. In some arrangements, the flat sheet is generally rectiplanar along a plane defined by axial direction 28 and lateral direction 44. In other arrangements, the flat sheet is curved in a manner similar to the curved bend lines 526 of the formed filter media sheet 502.

The elongated tetrahedron channels 550 and 552 allow for cross-flow between adjacent channels 558 and 560. In air filter implementations, this cross-flow allows for more even dust loading on the upstream side 504 of the media 500. In one embodiment, the elongated tetrahedron channels are shaped to purposely allow for more upstream 504 void volume than downstream 506 void volume, to increase filter capacity. Various fluids may be filtered, including air or other gases, and including liquids. In some embodiments, incoming dirty fluid 23 to be filtered flows along axial direction 28 into open tetrahedron channels 560 at upstream side 504 and passes laterally and/or transversely through the filter media wall segments of the rounded filter element and then flows axially along axial direction 28 as clean filtered fluid through open tetrahedron channels 550 at downstream side 506. A third subset of bend lines 564 provides lateral cross-flow thereacross along lateral direction 44 between respective channels downstream of upstream side 504. A first subset of bend lines 568 provides lateral cross-flow thereacross along lateral direction 44 between respective channels upstream of downstream side 506. In some arrangements, the first and third subsets of bend lines 568 and 564 have axially overlapping sections or crests (i.e., across the line 514), and the noted lateral cross-flow is provided at least at axially overlapping sections.

As will be appreciated, the air to be filtered can flow in the opposite direction defined by arrows 23 such that air to be filtered flows into what is represented as the downstream side 506, through the filter media 500, and out of what is represented as the upstream side 504. In such arrangements, the structure of the filter media 500 remains the same (i.e., the way the lines taper with respect to the upstream side 504 and the downstream side 506), but the flow through the media is reversed. For example, the filtered flows along axial direction 28 into open tetrahedron channels 550 at side 506 and passes laterally and/or transversely through the filter media second set of wall segments 546 of the pleated filter element and then flows axially along axial direction 28 as clean filtered fluid through open tetrahedron channels 560 at side 504. A second subset of bend lines 564 provides lateral cross-flow thereacross along lateral direction 44 between respective channels downstream of side 506. A fourth subset of bend lines 568 provides lateral cross-flow thereacross along lateral direction 44 between respective channels upstream of side 504. The second and fourth subsets of bend lines 564 and 568 have axially overlapping sections, and the noted lateral cross-flow is provided at least at axially overlapping sections. As previously stated, the elongated tetrahedron channels 550 and 552 allow for cross-flow between adjacent channels 558 and 560. In some embodiments of air filter implementations, the channels could be shaped such that the cross-flow between channels allows for more even dust loading on the downstream side 506 of the media 502. In one embodiment, the elongated tetrahedron channels are shaped to purposely allow for more downstream 506 void volume than upstream 504 void volume, to increase filter capacity.

The formed sheet 502 includes a plurality of embossments 512. In some arrangements, the embossments 512 are positioned along the crests of the rounded tetrahedron flow channels 510. The embossments allow the formed sheet 502 to maintain proper spacing from the flat sheet (e.g., in the arrangement shown in FIG. 2). For example, the embossments 512 may be positioned along line 514 (e.g., a contact line), which represents the contact point of the flat sheet with the formed sheet 502. The embossments 512 also serve to reduce the contact area between the formed sheet 502 and the flat sheet thereby reducing material masking of the filter media 500 and to enable cross-flow across the crests (i.e., across the line 514). In some arrangements, the embossments 512 have a height between 5 and 50 thousandths of an inch. In some arrangements, embossments 512 are positioned at spots along the formed sheet 502 where the formed sheet 502 does not initially touch the flat sheet (e.g., the embossments not positioned along the line 514). In some arrangements, the embossments 512 are spaced apart by at least 50 thousandths of an inch.

The embossments 512 serve to provide additional structural strength during uneven loading conditions. The embossments 512 may be provided in a uniform pattern across the formed sheet 502 or in a pattern that varies from the upstream to the downstream end of the filter media 500. In some arrangements, the embossments positioned along a crest protrude in the same direction of the crest. Accordingly, from the perspective of FIG. 5, the embossments along the line 514 protrude downward (i.e., into the paper), and the embossments adjacent to the line towards the upstream end 504 protrude outward (i.e., out of the paper). In other words, the embossments along the line 514 protrude downward opposite the transverse direction 40, and the embossments adjacent to the line 514 towards the upstream end 504 protrude upward along the transverse direction 40. As shown in the embodiment depicted in FIG. 5, the embossments 512 may take the form of dimples and may be substantially circular in shape, although the embossments 512 may possess noncircular shapes as well. Embossments 512 may be arranged on the first set of wall segments 554, the second set of wall segments 546, or both the first set of wall segments 554 and the second set of wall segments 546. Additionally, embossments 512 may be arranged on the first set of tetrahedron channels 560, the second set of tetrahedron channels 558, the third set of tetrahedron channels 552, and the fourth set of tetrahedron channels 550.

The combination of the embossments 512 and the curves 508 provide advantages to the filter media 500 in comparison to the filter media 100. The filter media 500 has a lower initial pressure drop than the filter media 100 due to more open area and less restriction for downstream fluid flow, which is created by the embossments 512 maintaining separation between the formed sheet 502 and the flat sheet. The filter media 500 also has a longer loading life due to the increased media open area in comparison to the filter media 100. The embossments 512 and curves 508 also provide added strength to the filter media 500. Accordingly, the filter media 500 is much less likely than the filter media 100 to experience local deformation or global deformation or collapse under extreme conditions. If deformation or collapse occurs, the embossments 512 reduce the contact area between the formed sheet 502 and the flat sheet. In arrangements where the filter media 500 is formed of the thinner media (i.e., the eleven thousandths of an inch thick media), these benefits are even greater. For example, loading life gain may be approximately 10-20% over the filter media 100.

Figure 6:
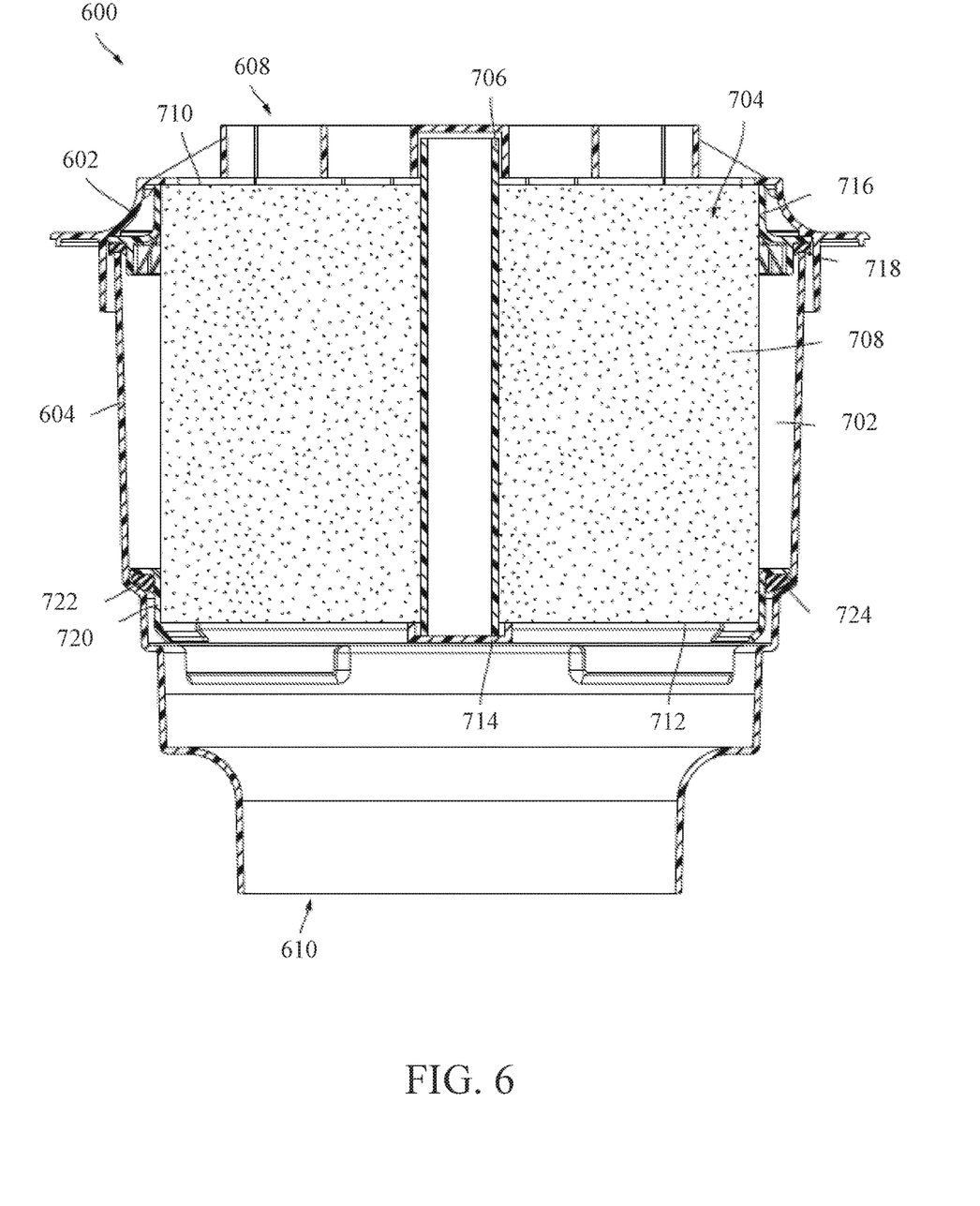
FIG. 6 shows a cross-sectional view of a filtration system according to an example embodiment.

Referring to FIG. 6, a cross-sectional view of an air filtration system 600 is shown according to an example embodiment. The system 600 filters air and provides clean air to a device, such as an internal combustion engine. The system 600 is shown with an upper member 602 secured to a housing 604. The upper member 602 is removably secured to the housing 604 through a plurality of connections formed between the upper member 602 and the housing 604. The connections are formed by any suitable mechanical connection, such as snap-fit connections (e.g., formed by mating detents on the housing 604 and the upper member 602), screws, bolts, or the like. In some arrangements, the upper member 602 is an inlet grate. The upper member 602 includes an inlet opening 608, and the housing 604 includes an outlet opening 610. The inlet opening 608 and the outlet 610 are substantially aligned such that a common axis passes through the centers of the inlet opening 608 and the outlet opening 610. Air to be filtered by the system 600 enters the housing 604 through the inlet opening 608, passes through the housing 604, and exits the housing 604 through the outlet opening 610. As described in further detail below, the housing 604 includes a filter element 704 positioned between the inlet opening 608 and the outlet opening 610 such that the air passing through the housing 604 is filtered through the filter element 704. Although the upper member 602 may contact certain portions of the filter element 704, the upper member 602 is not fixed to the filter element 704 such that the upper member 602 can be removed from the filter element 704 used with replacement filter elements. Since the upper member 602 is reusable with replacement filter elements, replacement filter elements can be produced at a lesser cost than replacement filter elements that have an integral cover portion. The reusable upper member 602 also reduces waste with each filter element replacement service in comparison to replacement filter elements that have an integral cover portion.

The housing 604 includes a central compartment 702 positioned between the inlet opening 608 and the outlet opening 610. As shown in FIG. 6, the filter element 704 is positioned in the central compartment 702 of the housing 604. The filter element 704 is in an installed position (i.e., the filter element 704 is received in the compartment 702 and the upper member 602 is secured to the housing 604). The filter element 704 is an axial flow filter element. The filter element 704 includes a central tube 706 and filter media 708 surrounding the central tube 706. In some arrangements, the central tube 706 is comprised of cardboard, which may be less expensive and more environmentally friendly than plastic. In one embodiment, the central tube 706 is not perforated or porous, although other embodiments may include perforations and/or a certain level of porosity. A portion of the central tube 706 extends into an opening in the upper member 602 when the filter element 704 is received in the housing 604 in the installed position. In an alternative arrangement, the central tube 706 does not extend into the upper member 602 and includes a cap to seal the top portion of the central tube 706. The filter media 708 includes an inlet face 710 that is substantially adjacent to the inlet opening 608 of the upper member 602. The filter media 708 includes an outlet face 712 that is substantially adjacent to the outlet opening 610. The inlet face 710 is spaced apart from the outlet face 712. The inlet face 710 is substantially parallel to the outlet face 712. In an alternative arrangement, the filter element 704 does not include a central tube. In such an arrangement, the filter media 708 may be wound around a removable core.

The filter media 708 includes the filter media 500, which comprises at least the formed sheet 502 and a flat sheet. The filter media 708 may be wound around the central tube 706. The central tube 706 is closed on both ends. A top end of the central tube 706 is closed by the upper member 602. In some arrangements, a bottom end of the central tube 706 is closed by a cap 714. However, it is possible for such a cap 714 to be used to close the top end of the central tube 706, either in place of or in addition to the use of a cap 714 on the bottom end of the central tube 706.

The filter element 704 includes an upper support ring 716. The upper support ring 716 circumscribes the filter media 708 adjacent the inlet face 710. The upper support ring 716 may be plastic, a polymer, or the like. In some arrangements, the upper support ring 716 is secured to the filter media 708 with an adhesive. In other arrangements, the upper support ring 716 is secured to the filter media 708 with a friction fit. The upper support ring 716 includes an upper seal 718. The upper seal 718 may be a flat gasket. The upper seal 718 may be an elastomeric seal. In some arrangements, the upper seal 718 is a molded polyurethane seal. When the filter element 704 is received within the housing 604, the upper seal 718 rests against an upper portion of the housing 604. The upper member 602 compresses the upper seal 718 against the housing 604 forming an axial seal between the upper support ring 716 and the housing 604. Accordingly, when the filter element 704 is received in an installed position within the housing 604, air passing through the system 600 (i.e., from the inlet opening 608 to the outlet opening 610) is forced to pass through the filter media 708. Additionally, the upper seal 718 also prevents dust buildup on the inside walls of the housing 604 during operation.

The upper seal 718 is compressed by an axial sealing force. The force of the upper member 602 pressing down on the filter element 704 when the filter element 704 is received within the housing 604 assists in creating the upper seal. In some arrangements, the compression distance for the upper seal 718 caused by the upper member 602 is limited to approximately fifteen to forty percent of the upper seal 718. However, because the upper seal is created with an axial sealing force, the pressure differential caused by the filter element between the inlet face 710 and the outlet face 712 also assists in pressing the upper seal 718 against the housing 604. Accordingly, if a technician does not fully tighten the upper member 602 onto the housing 604, normal operational forces caused by the air pressure differential across the filter element 704 are sufficient to create the upper seal.

In some arrangements, the filter element 704 includes a lower support ring 720. The lower support ring 720 circumscribes the filter media 708 adjacent to the outlet face 712. The lower support ring 720 may be plastic, a polymer, or the like. In some arrangements, the lower support ring 720 is secured to the filter media 708 with an adhesive. In other arrangements, the lower support ring 720 is secured to the filter media 708 with a friction fit. The lower support ring includes a lower support element 722. The lower support element 722 may be an annular support element comprised of a porous and deformable material. In some arrangements, the lower support element is a permeable media gasket. In some arrangements, the lower support element 722 is comprised of an open foam, a lofty meltblown permeable media, or felt. When the filter element 704 is received within the housing 604 in an installed position, the lower support element 722 rests against an angled surface 724 of the housing 604. In some arrangements, attachment of the upper member 602 to the housing 604 compresses the lower support element 722 against the angled surface 724 when the filter element 704 is received within the housing 604 in an installed position. The lower support element 722 helps position and secure the filter element 704 during installation of the filter element 704 into the housing 604. After installation into the installed position, the lower support element 722 helps to retain the filter element 704 in the installed position and helps to reduce vibration of the filter element 704 during use. Further, the lower support element 722 reduces the risk of the filter element 704 vibrating against the housing 604, referred to as "chatter," during use of the filter element 704. Additionally, the lower support element 722 significantly reduces the surface friction between the filter element 704 and the housing 604 over a polyurethane seal. In some arrangements, the lower support ring 720 does not include a lower support element 722. In such arrangements, the upper seal 718 is the primary support surface between the housing 604 and the filter element 704 when the filter element 704 is received in the housing 604. In other arrangements, the filter element does not include a lower support ring 720.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:
1. Filter media comprising:
a first sheet of filter media having a first side and a second side, the first sheet formed at an upstream end and a downstream end to have a plurality of curves that follow a sinusoidal pattern, the sinusoidal pattern form- ing a plurality of rounded tetrahedron flow channels that are alternately sealed to each other at the first side to define:
a first set of rounded tetrahedron channels having open first ends, and
a second set of rounded tetrahedron channels interdigitated with the first set of tetrahedron channels and having closed first ends,
the first sheet of filter media comprising:
a first plurality of embossments positioned along a line that represents a contact line between the first sheet and a second sheet, the first plurality of embossments protruding downward opposite a transverse direction; and
a second plurality of embossments positioned between the upstream end and the downstream end, the second plurality of embossments disposed adjacent to the line on a transition between adjacent ones of the plurality of curves, the second plurality of embossments protruding upward along the transverse direction,
the second sheet of filter media extending across the first sheet of filter media, the second sheet of filter media is a flat sheet of filter media.

2. The filter media of claim 1, wherein the first plurality of embossments are arranged at crests of the rounded tetrahedron flow channels.

3. The filter media of claim 2, wherein the embossments are provided in a uniform pattern across the first sheet.

4. The filter media of claim 2, wherein the second sheet of media is a curved sheet of filter media and wherein the first plurality of embossments are arranged to interact with the second sheet of filter media.

5. The filter media of claim 1, wherein the plurality of rounded tetrahedron flow channels is a first set of wall segments alternately sealed to each other at the first side, and further comprising a second set of wall segments alternately sealed to each other at the second side to define:
a third set of tetrahedron channels having closed second ends, and
a fourth set of tetrahedron channels interdigitated with the third set of tetrahedron channels and having open second ends.

6. The filter media of claim 1, wherein the first side comprises the upstream end configured to receive fluid to be filtered, and wherein the second side comprises the downstream end configured to output filtered fluid.

7. The filter media of claim 1, wherein the second side comprises the upstream end configured to receive fluid to be filtered, and wherein the first side comprises the downstream end configured to output filtered fluid.

8. The filter media of claim 1, wherein the first side comprises a substantially curved inlet.

9. A filter element comprising the filter media of claim 1.

10. The filter media of claim 1, wherein the plurality of curves are a plurality of curved bend lines, wherein the first sheet of filter media further comprises a plurality of wall segments extending between the plurality of bend lines, and wherein each of the second plurality of embossments is disposed along a respective one of the wall segments in between adjacent ones of the plurality of bend lines.

11. The filter media of claim 1, wherein the second plurality of embossments are not positioned along a bend line of the first sheet of filter media.

12. Filter media comprising:
a curved sheet of filter media having an upstream end and a downstream end, the curved sheet being folded along a plurality of curves that follow a sinusoidal pattern, the sinusoidal pattern forming a plurality of rounded tetrahedron flow channels, the curved sheet of filter media comprising:
a first plurality of embossments positioned between the upstream end and the downstream end, the first plurality of embossments arranged at crests of the rounded tetrahedron flow channels, the first plurality of embossments protruding downward opposite a transverse direction; and
a second plurality of embossments positioned between the upstream end and the downstream end, the second plurality of embossments disposed adjacent to the crests on a transition between adjacent ones of the plurality of curves, the second plurality of embossments protruding upward along the transverse direction.

13. The filter media of claim 12, wherein at least one embossment of the first plurality of embossments forms a raised surface that maintains a separation distance between a second sheet of filter media and the curved sheet of filter media, the second sheet of filter media extending across the curved sheet of filter media.

14. The filter media of claim 12, wherein the first plurality embossments are positioned along a line that represents a contact line between the first sheet and a second sheet of filter media, the second sheet of filter media extending across the curved sheet of filter media.

15. The filter media of claim 12, wherein the first plurality of embossments are positioned along a line that represents a contact line between the first sheet and the second sheet, and wherein the second plurality of embossments are adjacent to the line.

16. The filter media of claim 12, wherein the first plurality of embossments are provided in a uniform pattern across the curved sheet.

17. A filtration system comprising:
a housing body, the housing body comprising:
a housing outlet, a housing inlet, and a central compartment; and
a filter element installed in the central compartment, the filter element comprising filter media, the filter media comprising:
a first sheet of filter media having a first side and a second side, the first sheet of filter media formed at an upstream end and a downstream end to have a plurality of curves that follow a sinusoidal pattern, the sinusoidal pattern forming a plurality of rounded tetrahedron flow channels that are alternately sealed to each other at the first side to define:
a first set of rounded tetrahedron channels having open first ends,
the first sheet of filter media comprising:
a first plurality of embossments positioned between the upstream end and the downstream end, the first plurality of embossments positioned along a line that represents a contact line between the first sheet and the second sheet and protruding downward opposite a transverse direction; and
a second plurality of embossments positioned between the upstream end and the downstream end, the second plurality of embossments disposed adjacent to the line on a transition between adjacent ones of the plurality of curves, the second plurality of embossments protruding upward along the transverse direction; and a second set of rounded tetrahedron channels interdigitated with the first set of tetrahedron channels and having closed first ends; and a second sheet of filter media extending across the first sheet of filter media.

18. The filtration system of claim 17, wherein the first plurality of embossments are arranged at crests of the rounded tetrahedron flow channels.

19. The filtration system of claim 17, further comprising:

an upper member removably secured to the housing body, the upper member comprising an inlet opening aligned with the housing inlet, wherein a portion of the filter element contacts the upper member.

20. The filtration system of claim 17, further comprising:

an upper support ring coupled to the first side of the filter media, the upper support ring circumscribing the filter media adjacent the first side.

\* \* \* \* \*